United States Patent
Stoddart et al.

(10) Patent No.: US 6,619,343 B2
(45) Date of Patent: Sep. 16, 2003

(54) SEAL FOR FUEL FILLER TUBES

(76) Inventors: Steve Stoddart, 3340 Crestwater Ct. #1704, Rochester Hills, MI (US) 48309; Greg Dyer, 3845 Hi Villa Dr., Lake Orion, MI (US) 48360

(*) Notice: Subject to any disclaimer, the term of this patent is extended or adjusted under 35 U.S.C. 154(b) by 0 days.

(21) Appl. No.: 10/034,142

(22) Filed: Dec. 21, 2001

(65) Prior Publication Data

US 2002/0096228 A1 Jul. 25, 2002

Related U.S. Application Data

(60) Provisional application No. 60/257,899, filed on Dec. 21, 2000.

(51) Int. Cl.$^7$ ................................................. B65B 1/04
(52) U.S. Cl. ..................................... 141/286; 220/86.2
(58) Field of Search ............................... 141/286, 301, 141/302, 382, 388, 349, 350; 220/86.1, 86.2, 86.3

(56) References Cited

U.S. PATENT DOCUMENTS

| | | |
|---|---|---|
| 2,466,076 A | 4/1949 | Bentley et al. |
| 5,305,903 A | 4/1994 | Harde |
| 5,360,040 A | 11/1994 | Thorn et al. |
| 5,427,263 A | 6/1995 | Bowles |
| 5,466,016 A | 11/1995 | Briody et al. |
| 5,794,805 A | 8/1998 | Branham |
| 6,026,855 A | 2/2000 | Jackson et al. |
| 6,260,578 B1 | 7/2001 | Kuehnemund et al. |

*Primary Examiner*—Steven O. Douglas
(74) *Attorney, Agent, or Firm*—Clark Hill PLC

(57) ABSTRACT

A fuel tank filler neck assembly includes a resilient seal interposed between a flanged opening in the fuel tank and a filler pipe. The seal is preferably molded or otherwise manufactured from an elastomer, which provides an effective barrier to the permeation of fuel vapors. The seal has a plurality of ribs that assist in bore retention as the filler pipe is inserted through the flanged opening. An alternative embodiment includes a ribbed resilient seal with a metal insert contained within an elastomeric matrix. The metal insert aids in the alignment and installation of the seal. In all embodiments, the seal provides a resilient and secure leak tight joint for use in metallic and polymeric fuel tanks.

10 Claims, 2 Drawing Sheets

SEAL FOR FUEL FILLER TUBES

This appln claims benefit of Prov. No. 60/257,899 filed Dec. 21, 2000

BACKGROUND OF THE INVENTION

1. Field of the Invention

The subject invention relates to a fuel tank assembly, and more particularly, to a mechanically sealed joint used to connect a filler pipe to a fuel storage tank.

2. Description of the Related Art

A common method of providing a seal at the filler neck joint is to extend the neck of the filler pipe through an opening in the fuel tank and solder the adjoining material of the two components to form an assembly. Generally a lead-tin material is used to solder the joint. The filler neck may be provided with a lead-tin coating or the like to obtain a secure solder joint and provide corrosion resistance.

With soldered construction, a clean metal surface on the tank and filler neck must be provided at the joint. The tank generally has a corrosion resistant coating on the base metal that may have to be removed in the area to be soldered. A problem with removing the coating is that the corrosion resistance aspect is defeated by exposing the base metal. Therefore, a re-application of additional corrosive resistant material may be required to obtain an acceptable corrosion free life expectancy from the assembly. Obviously, this method is also limited to metallic fuel tanks.

Another method of connecting a filler pipe to a fuel tank involves the use of a resilient grommet. In this type of assembly the grommet is inserted into an opening in the fuel tank and then the filler neck is clamped or fastened to the grommet. The resiliency of the grommet allows it to deform and may permit movement of the filler pipe relative to the tank. This technique is applicable to both metallic and polymeric fuel tanks.

Yet another common technique is the use of an intermediary elastomeric hose that connects at one end to the main fuel filler tube and at the other end to a fuel tank nipple or "spud" connector.

Although these grommet and hose techniques provide leak tight seals, they do not prevent the permeation of fuel vapors at the assembly. Recent P-ZEV legislation restricts the amount of fuel vapor that can be released from the fuel tank, therefore, a more permeation-resistant assembly technique is needed.

SUMMARY OF THE INVENTION

The present invention addresses the need for a more versatile and permeation-resistant joint in the construction of fuel filler neck assemblies. A leak tight seal is provided that eliminates the need to use solder and solder compatible coatings yet provides a durable connection with good resistance to separation or leak formation.

According to one aspect of the invention there is provided a filler neck assembly for interconnecting a fuel filler tube to a fuel tank. The filler neck assembly comprises a fuel filler tube for providing fluid passage to the fuel tank and a fuel spud connector adapted to be fixedly secured to the fuel tank. The spud connector has an inner wall defining a fluid passageway into the fuel tank and an open distal end for receiving the fuel filler tube. A resilient seal is interposed between the inner wall of the spud connector and the fuel filler tube for sealing the connection therebetween of fuel vapor.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
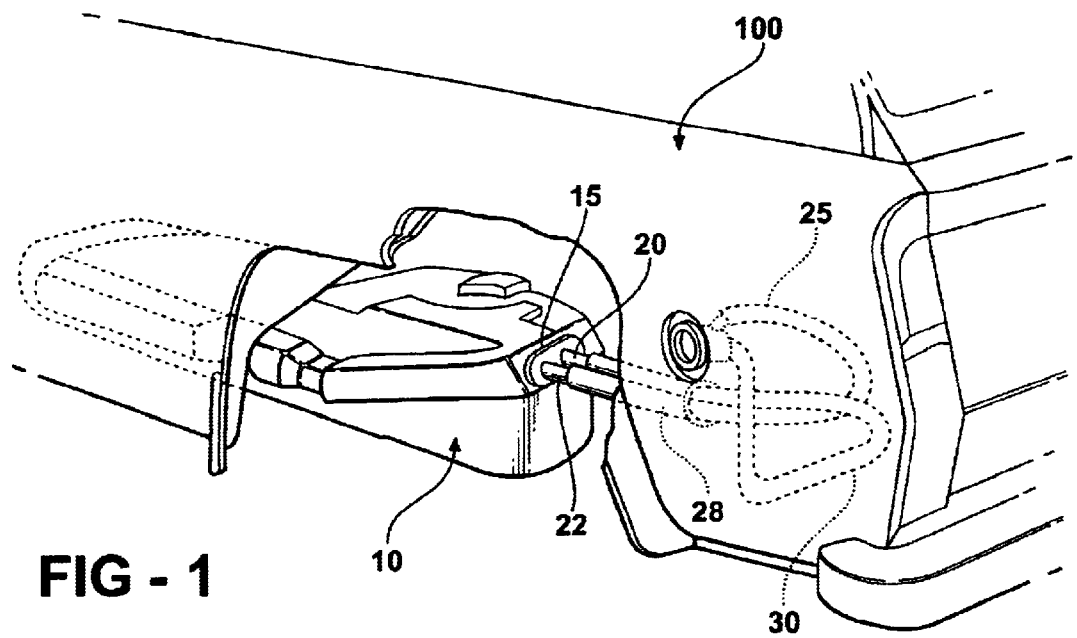
FIG. 1 is a schematic view of a prior art fuel tank assembly for use in a vehicle.
Figure 2:
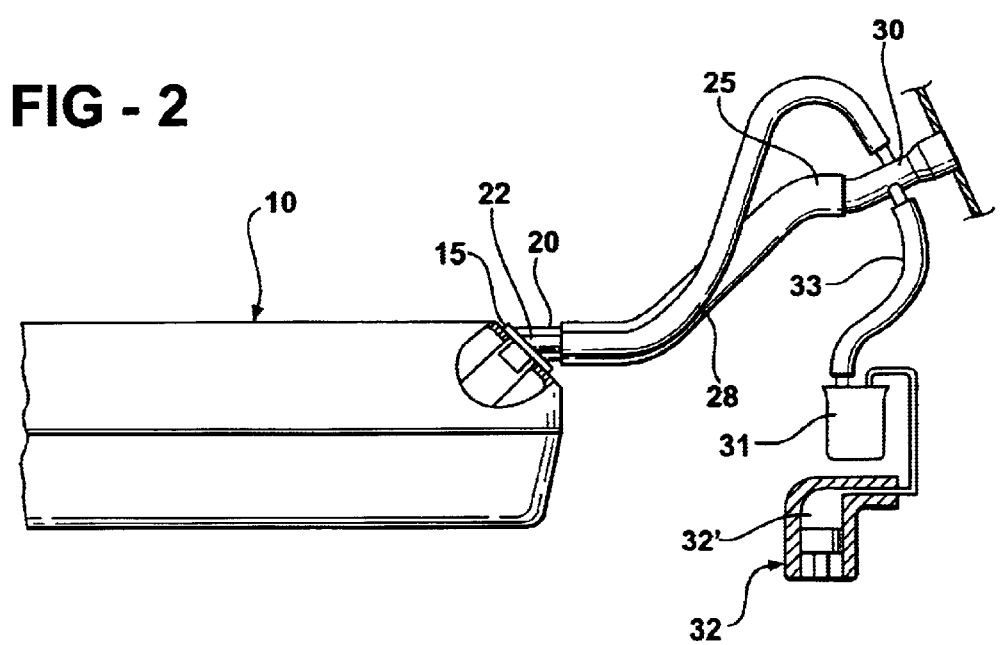
FIG. 2 is an elevational schematic view of a portion of the prior art fuel tank assembly according to FIG. 1.

Referring to the Figures, wherein like numerals indicate like or corresponding parts throughout the several views, FIG. 1 shows a fuel tank 10 which is molded from suitable thermoplastic material, such as a nylon or high-density polyethylene, having good retention of mechanical properties at elevated temperatures and resistance to chemicals, such as gasoline. The fuel tank 10 is operatively mounted in a vehicle 100 and has a base plate 15 which is heat welded or fused to the wall of tank 10 and is formed with an outwardly extended fuel inlet nipple or spud 20. Referring to FIG. 2, the inlet nipple 20 is adapted to be connected to a flexible hose or tube 25 which in turn is connected to a stationary fuel filler tube 30.

A vent or exhaust nipple (spud) 22 for vaporous fuel is formed by base plate 15 and extends outwardly therefrom adjacent to the inlet or fill nipple 20. The vent nipple 22 is connected to a flexible vapor exhaust or vent tube 28 that is preferably connected to the interior of the upper portion of the filler tube 30. Another conduit 33 connects the interior of the filler tube 30 to an on-board vapor storage canister 31. Canister 31 temporarily stores vaporous fuel and subsequently introduces that vaporous fuel to combustion chambers 32' of an internal combustion engine 32 of the associated vehicle 100. If the above described vapor control is not utilized, vaporous fuel may be vented back into another area, such as into the fuel filler tube 30.

Figure 3:
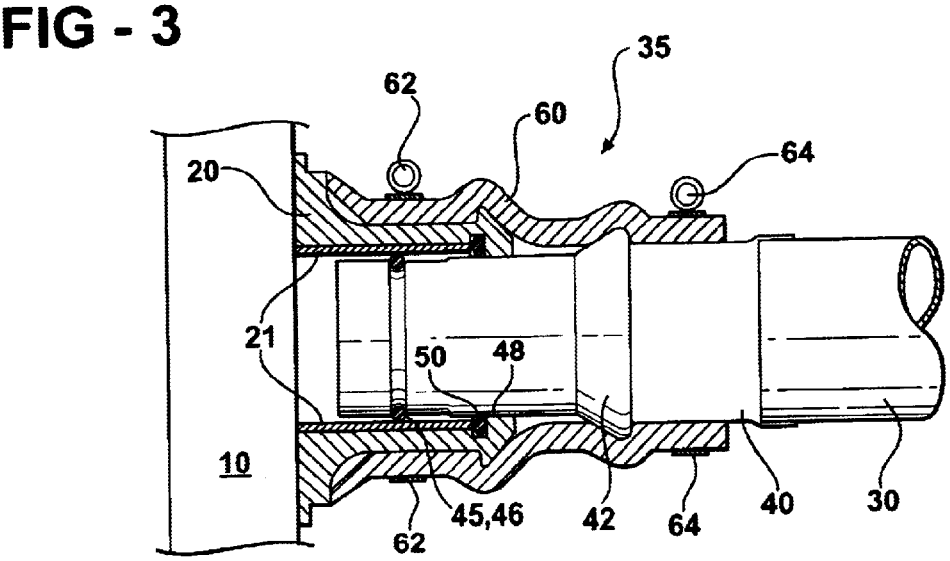
FIG. 3 is a cross-sectional view of a fuel tank inlet nipple of FIGS. 1 and 2 showing the connection to the fuel filler tube according to a first embodiment.

Referring now to FIG. 3, a first embodiment of a fuel filler neck assembly is disclosed at 35 whereby the fuel filler tube 30 has convolutions that maintain flexibility, and therefore, replace the need for a separate hose 25. Instead, a short tube extension or adaptor 40 is welded or brazed to the main fuel filler tube 30. The adaptor 40 has a tube hose bead 42 and an O-ring seal 45 seated in a groove 46. The tank nipple or spud connector 20 surrounds the adaptor tube 40 to connect the tube 40 to the fuel tank 10. The spud 20 has an inner barrier layer 21 which helps prevent the permeation of fuel vapor to the outside environment. The spud 20 also has a groove 48 at the end distal to the interface to the fuel tank 10. A resilient seal pack 50 is seated and contained within the groove 48. The seal pack 50 is preferably made from a permeation resistant polymer such as a fluorelastomer, sold commercially as "Viton". The seal pack 50 may be insert molded into the tank spud 20 in a separate preliminary operation using well-known molding technology. The seal pack 50 may also be mechanically inserted into place.

A flexible hose 60 surrounds the tank spud 20 and at least part of the filler tube adaptor 40. The end of the hose 60 closest to the fuel tank interface is flared. At least two hose clamps 62, 64 attach or otherwise secure the flexible hose 60 to the filler tube adaptor 40.

The fuel filler neck assembly is advantageous because it is insensitive to normal dimensional tolerances between the filler tube 30 and tank spud 20. The filler tube 30 and adaptor 40 can be inserted at a slight angle to the tank spud 20 without affecting the seal integrity, and the required insertion forces are lower. The presence of a permeation resistant barrier layer 21 in the tank spud 20 and a second permeation resistant seal pack 50 allow the fuel filler neck assembly to meet stringent emission requirements.

Figure 4:
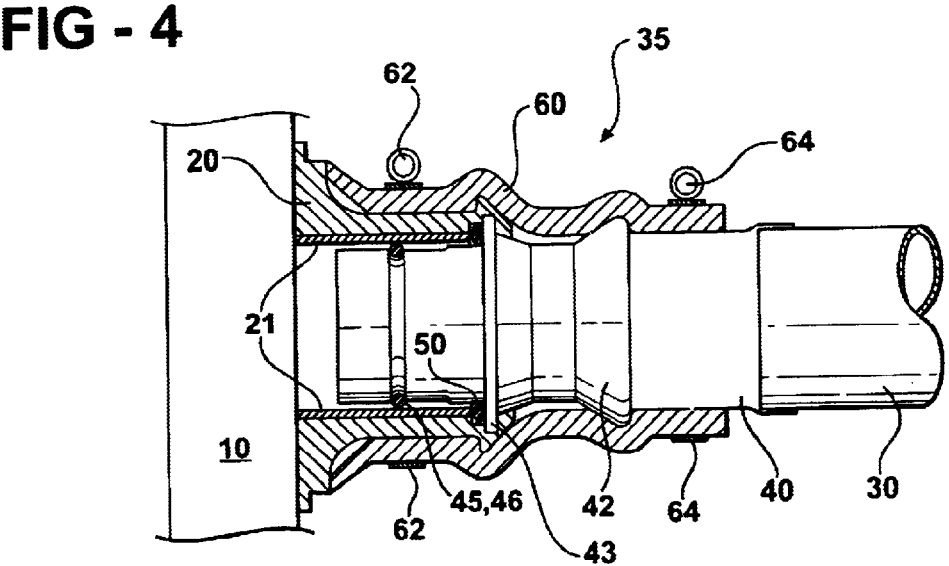
FIG. 4 is a cross-sectional view of a fuel tank inlet nipple of FIGS. 1 and 2 showing the connection to the fuel filler tube according to a second embodiment.

FIG. 4 discloses a second embodiment that is similar to the first, except that the adaptor tube 40 has a tube locking bead 43 that engages an extra groove distal from the fuel tank interface. In this case, the seal pack 50 is preferably inserted into the spud 20 by manual or mechanical means, rather than being insert molded into place.

Figure 5:
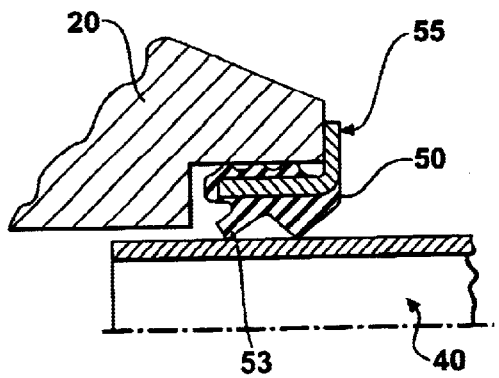
FIG. 5 is a detailed cross-sectional view of a seal pack with rigid insert.

A further improvement to the seal pack 50 is disclosed in FIG. 5. The seal 50 has a plurality of ribs 53 that assist in bore retention as the filler pipe or adaptor 40 is inserted through the flanged opening. Further, the ribbed seal pack 50 has a rigid insert 55 contained within an elastomeric matrix. The insert 55 is preferably made from metal, and aids in the alignment and installation of the seal. With this press fit embodiment, the secondary O-ring and groove arrangement shown as 45, 46 in FIGS. 3 and 4 is optional.

Having now fully described the invention, any changes can be made by one of ordinary skill in the art without departing from the scope of the invention as set forth herein. For example, the fuel tank could be manufactured from stainless steel or other metal, in which case the tank nipple or spud would also be composed of the same metal.

What is claimed is:

1. A filler neck assembly for interconnecting a fuel filler tube to a fuel tank and substantially reducing the amount of fuel vapor emissions, said filler neck assembly comprising:

a fuel filler tube for providing fluid passage to the fuel tank, said fuel filler tube having a distal end;

a fuel filler tube extension attached to said distal end of said filler tube;

a fuel spud connector extending outwardly from and fixedly secured to the fuel tank, said spud connector having an inner wall defining a fluid passageway into the fuel tank and an open distal end for receiving said fuel filler tube extension;

a first seal defined by a permeation-resistant inner barrier layer on said inner wall of said spud connector; and a resilient second seal interposed between said inner wall of said spud connector and said fuel filler tube extension for sealing the connection therebetween of fuel vapor.

2. A filler neck assembly as set forth in claim 1 further including an annular groove formed in said inner wall and said second resilient seal seated in said annular groove.

3. A filler neck assembly as set forth in claim 1 wherein said second resilient seal has a ribbed outer surface press fit between said inner wall of said spud connector and said fuel filler tube extension for providing a fuel vapor seal therebetween.

4. A filler neck assembly as set forth in claim 3 wherein said second resilient seal includes a flanged rigid insert embedded in said second seal for seating said second seal against said spud connector and between said inner wall and said fuel filler tube extension.

5. A filler neck assembly as set forth in claim 1 wherein said fuel filler tube extension includes an outer tube wall having an annular groove formed therein.

6. A filler neck assembly as set forth in claim 5 further including an O-ring seal seated in said annular groove of said fuel filler tube extension for providing a fuel vapor seal between said inner wall of said spud connector and said fuel filler tube extension.

7. A filler neck assembly as set forth in claim 6 wherein said fuel filler tube extension includes an outer annular bead disposed adjacent said open end of said spud connector.

8. A filler neck assembly as set forth in claim 7 further including a flexible tubular hose surrounding the connection of said spud connector and fuel filler tube extension.

9. A filler neck assembly as set forth in claim 8 further including at least one clamp securing said flexible hose to said spud connector and said fuel filler tube extension.

10. A filler neck assembly as set forth in claim 9 wherein said second resilient seal is primarily composed of an elastomer that resists permeation of fuel vapors.

* * * * *